Feb. 20, 1968   J. O. SCOTT ET AL   3,369,395
FORMATION PRESSURE TESTER
Filed Nov. 3, 1964
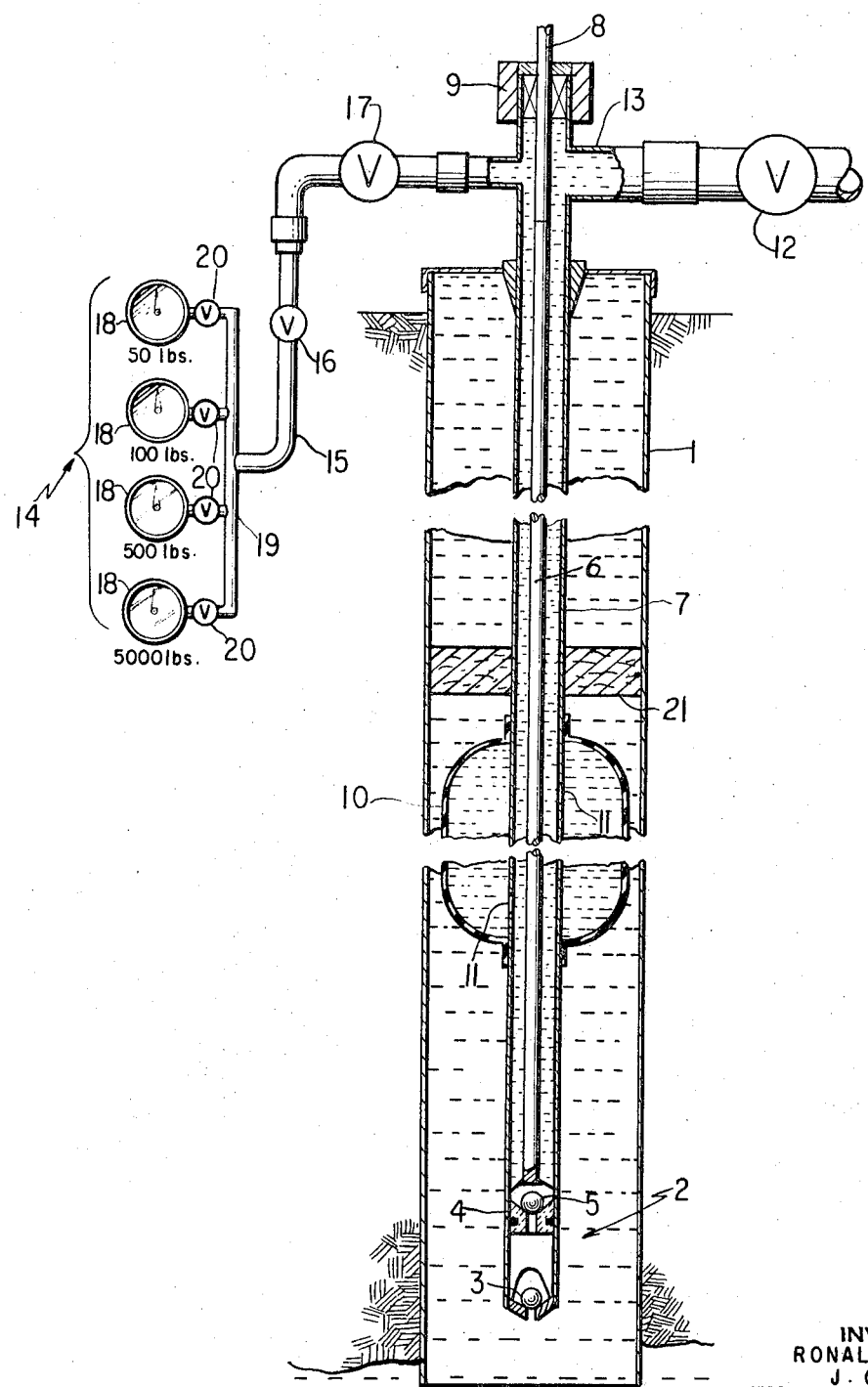
INVENTORS
RONALD G. NELSON
J. O. SCOTT
BY
ATTORNEY

United States Patent Office 3,369,395
Patented Feb. 20, 1968

3,369,395
FORMATION PRESSURE TESTER
J. O. Scott, Tulsa, Okla., and Ronald G. Nelson, Omaha, Nebr., assignors to Cities Service Oil Company, a corporation of Delaware
Filed Nov. 3, 1964, Ser. No. 408,599
1 Claim. (Cl. 73—152)

The present invention relates to a formation pressure tester. More particularly, it relates to a formation pressure tester suitable for determining pressure build-up within a bore hole.

It is well-known that bottom hole pressure build-up data is necessary for efficient oil field exploitation. Pressure build-up curves are used to determine formation flow capacity and the ability of wells to produce formation fluids at efficient rates. In oil wells in which the reservoir pressure has declined so that they must be pumped in order to obtain efficient oil production, the relatively low formation pressures make it difficult to obtain accurate and reliable pressure build-up curves.

Numerous methods and devices have been proposed for determining bottom hole pressure build-up data in pumped wells. One method is to cease pumping the well and immediately determine the fluid level in the well as a function of time. This is accomplished either by measuring the echo time or recording the position of a float. This method, however, is not highly sensitive and is subject to large errors when a froth or foam exists on top of the fluid level. An additional disadvantage of this method is that the pressure build-up curves must be corrected for the flow into the well following cessation of production.

In a more reliable survey method, the bottom hole pressure is measured directly by means of a pressure element lowered to the bottom of the wellbore. For example, it has been proposed to employ a bottom hole sensing gauge designed to be attached to the bottom of a production tubing and connected to the surface by means of insulated electrical wire run with the tubing. The pressure is determined by sending current down the wire from the surface to the gauge and reading back a pulsed component. The cost of installing such a gauge in a well, together with the electrical transmission lines needed to connect the device to the surface, is relatively high and may preclude the use of such a gauge in low capacity wells.

It is an object of the present invention, therefore, to provide an improved formation pressure tester.

It is another object of this invention to provide a bottom hole formation pressure tester suitable for measuring bottom hole pressure directly with a pressure element positioned at the bottom of the bore hole.

It is another object of this invention to provide a bottom hole formation pressure tester by means of which subsurface pressure changes are instantly observable at the surface.

It is a further object of this invention to provide a formation pressure tester that can be instantly employed to measure pressure build-up in a well at any time without the need for special wire line equipment.

It is a further object of this invention to provide a formation pressure tester having sufficient sensitivity for the interpretation of pressure build-up curves in pumping wells.

It is a further object of this invention to provide a bottom hole formation pressure tester that is inexpensive and can be run into the well as an integral part of the production string.

With these and other objects in view, the present invention is hereinafter described with reference to the accompanying drawing illustrating an embodiment thereof.

The objects of this invention are accomplished by means of an elastic, expandable pressure-responsive bladder than can be mounted at the end of a tubing string inserted in the wellbore. The bladder, having the form of an elongated balloon, has a reinforced elastic wall capable of withstanding an internal pressure sufficient to inflate the bladder so as to fill the space between the well wall and the tubing string. Ideally, the length of the bladder is sufficient to traverse the producing interval.

The bladder of the present invention is lowered into a well on the bottom of a string of tubing. A packer is preferably mounted on the tubing just above the bladder. When the packer is set, it serves to isolate the producing portion of the well, thereby preventing afterflow when the well is shut in. Fluid is thereafter pumped into the tubing string so as to expand the bladder until it contacts the wall of the well or the well casing, thereby filling the well. The pressure required to so expand the bladder may be determined from a plot of pressure versus injected fluid volume. The bladder will generally have a linear pressure response to volume of fluid injected. When the wall of the well casing is contacted, expansion of the bladder is blocked, and the pressure will begin to rise rapidly. The pressure in the bladder is then relieved until the bladder separates slightly from the wall of the well. The tubing string is then shut in, and a sensitive differential pressure measuring device is attached to the tubing string to record internal pressure changes in the bladder.

As pressure builds up in the well, it tends to compress the inflated bladder. The resultant increase in the internal pressure within the bladder will correspondingly increase the pressure in the tubing string that is measured at the surface. Because of the surface recording feature of the differential pressure measuring device, a manifold may be employed to rapidly switch from one differential element to another having the proper range and sensitivity for any portion of the pressure build-up test.

The bladder of the present invention may also be included as an element of a rod pumping installation as illustrated in the accompanying drawing. In the drawing, the well casing is represented by the numeral 1. Positioned at the lower extremity of the well casing is rod pump 2 having a ball check standing valve 3. Rod pump 2 also comprises plunger 4 and ball check travelling valve 5 attached to sucker rod 6 positioned within production string 7. Sucker rod 6 is operated from the surface by means of polished rod 8 having packing element 9 mounted thereon to prevent leakage of well fluids at the surface. Leakage through packing gland or any of the tubing joints cannot be tolerated if such leakage causes bladder 10 to deflate before the pressure build-up test is completed.

Expandable elastic bladder 10 is mounted on production string 7 that is provided with ports 11 providing communication between the interior of bladder 10 and the inner portion of production string 7. Packer 21 is mounted on the production string just above the bladder.

Oil pumped by rod pump 2 through production string 7 normally passes through production valve 12 in flow line 13. Pressure measuring device 14 is in communication with production string 7 by means of line 15 containing valve 16 and pressure tap 17. Differential pressure measuring device 14 comprises various pressure gauges 18 for measuring varying pressure ranges encountered during the pressure build-up test. Each gauge is in communication with line 15 by means of pressure gauge manifold 19, which contains valves 20 controlling each pressure gauge.

While the well is pumping, production string 7 is filled with reservoir liquid to the well head. Bladder 10 is located as close to the pump as possible, lying preferably below the pumping fluid level in the annulus between production string 7 and well casing 1. The bladder is in an expanded state during pumping of the well, but it does not seal against well casing 1. When a pressure build-up test is to be initiated, valve 16 is opened so that all lines of pressure gauge manifold 19 are filled with liquid. Pumping is then terminated, and production valve 12 is closed, packer 21 is then set in order to isolate the bladder, from afterflow. The appropriate valve in pressure gauge manifold 19 is opened. As the fluid level rises in the annulus of the well, the expanded bladder 10 begins to contract, thereby increasing the internal pressure within the bladder. This increased pressure is transmitted through the fluid-filled production string 7 to the surface pressure gauges 20. For initial pressure build-up measurement, the lower range gauges are generally employed for greater sensitivity. As the pressure build-up continues, these gauges are shut-in manually or automatically as they reach their maximum deflection. Continuous recording pressure measuring devices may be substituted for differential pressure measuring device 14 if automated operation is desired.

The present invention thus utilizes the fluid-filled production tubing of the well having an internal pressure higher than that existing in the well outside the production tubing. As the pressure in the well changes during the pressure build-up test, the external pressure change is superimposed upon the higher internal pressure so that the change may be readily observed at the ground surface by a conventional pressure sensing system. The amplitude pressure change transmitted through the fluid-filled tubing string is dependent upon the elastic volumetric contraction of a pressure-responsive element integral with the tubing or, in the limit, the tubing itself. The contraction of the steel tubing itself, if used alone, will produce an increase of pressure within the tubing. Owing to the compressibility of the well fluid, however, the amplitude of pressure change will be less than the external pressure change producing the contraction. In addition, small leaks in the tubing may limit or prevent any pressure change from occurring within the tubing. By increasing the volume of deformation per increment of pressure change by including in the tubing string a more highly contractile element, such as an elongated rubber bladder, the amplitude of pressure change transmitted through the fluid-filled tubing string may be increased. Increasing the amplitude of pressure change also serves to decrease the effect of small leaks in the pressure change transmitted to the ground surface.

The size of the bladder used in accordance with the present invention must be sufficient so that the bladder is still in an expanded state at the end of the pressure build-up test. If the bladder should reach a totally collapsed state during the test, further annulus pressure build-up will not be transmitted to the surface. The required size of the bladder, which generally will be capable of withstanding an internal pressure of several thousand pounds per square inch, will be dependent on the length and inside diameter of the well tubing, the compressibility of the liquid in the tubing, the diameter of the casing, and the probable maximum build-up pressure that will be measured. For example, in a well having a tubing length of 6,000′, a 2.375″ outside diameter production tubing with an internal volume factor of 6′ per gallon, a compressibility of liquid of $10^{-5}$ vol./vol./p.s.i., a well casing diameter of 5½″, a maximum reservoir pressure in the range of about 500 to 600 p.s.i., the volume of liquid in the tubing would be $$\frac{6,000 \text{ ft.}}{6 \text{ ft.}}$$

per gallon, or 1,000 gallons of fluid in the tubing. The maximum compressibility of the liquid in the tubing would be (1,000 gallons) ($10^{-5}$ gal./gal./p.s.i.) (600 p.s.i.) or 6 gallons. The minimum size of the bladder, in this case, must be such that it would have at least 6 gallons of internal liquid volume when the bladder is in an expanded position during the pumping of the well. The size of the bladder at the start of the pressure build-up test should not be such that the bladder touches the 5½″ casing. If the bladder is expanded to a diameter of 5″, for example, at the start of the test, the bladder must be at least 8′ long.

In actual practice, it would not be practical or possible to design one bladder to work under any and all wellbore conditions. Nor would it be economically practical to custom design a bladder for each wellbore condition that is met. The use of multiple standard bladders having some arbitrary length to be mounted on corresponding lengths of tubing is the most practical approach to field useage of the present invention. For a particular well, the required number of bladders can be connected to the lower portion of the tubing and run on the production string to the desired depth.

The size of the elastic contractile element, or bladder, may be further determined in accordance with the following formula if the modulus of elasticity of the bladder is large compared to the modulus of elasticity of the tubing:

$$\frac{dP_i}{dP_o} = \frac{1}{\frac{h_i CE}{2h_o}+1}$$

where $$\frac{dP_i}{dP_o}$$

is the ratio of internal pressure change to external pressure change; $h_i$ is the total length of tubing; $h_o$ is the length of the elastic bladder; C is the compressibility of fluid within the tubing; and E is the modulus of elasticity of the bladder.

The present invention makes subsurface pressure changes instantly observable at the ground surface without requiring the connection of electrical transmission lines between the ground surface and subsurface sensing device. It is likewise not dependent upon running a recording pressure gauge into the well and withdrawing it at a later time. The elastic contractile bladder of the present invention can be run into the well as an integral part of the production tubing so as to be instantly available for measuring pressure build-up in the well at any time without the need for special wire line equipment and with a minimum interference with production.

It will be understood that changes in the details and arrangements of parts, which have been herein described and illustrated in order to explain the nature of invention, may be made by those skilled in the art within the principle and scope of the invention as expressed in the appended claims.

We claim:

1. A bottom hole formation pressure tester capable of determining pressure build-up at the producing interval of production wells said device comprising in combination:
   (a) a production string having ports therein, mounted above the well bore and extending downwardly into the well bore.
   (b) an elastic, expandable pressure-responsive bladder mounted on the production string, said pressure bladder having an elastic wall capable of withstanding an internal pressure sufficient to inflate the pressure element so that it contacts the wall of the well or the well casing and substantially fills the space between the well or casing and the production string, the size of said pressure bladder being sufficient to remain in an expanded state at the end of the pressure build-up test;
   (c) a packer mounted on said production string just above said bladder, the packer when set serving to isolate the producing interval and to prevent afterflow into the well following cessation of production;

(d) hydraulic means operable from the surface for applying an internal pressure through said production string to the bladder sufficient to inflate said bladder, said hydraulic means serving also to transmit internal pressure variations through the production string between said bladder and the surface;

(e) pressure measuring means in communication with the production string for recording internal pressure variations transmitted from said bladder;

whereby the internal pressure within the inflated bladder is greater than the external pressure in the well when the pressure build-up test is initiated, the external pressure change in the well being superimposed upon the higher internal pressure within said bladder, the increased volume of deformation per increment of pressure change increasing the amplitude of internal pressure change transmitted to the surface so that the pressure change may be observed at the surface by said conventional pressure sensing system.

References Cited

UNITED STATES PATENTS

| | | | |
|---|---|---|---|
| 1,850,218 | 3/1932 | Thomas | 166—187 |
| 2,314,540 | 3/1943 | Huntington | 166—187 |
| 2,647,585 | 8/1953 | Roberts | 166—187 |

RICHARD C. QUEISSER, *Primary Examiner.*

J. W. MYRACLE, *Assistant Examiner.*